United States Patent [19]
Ayerst et al.

[11] Patent Number: 5,644,568
[45] Date of Patent: Jul. 1, 1997

[54] METHOD AND APPARATUS FOR ORGANIZING AND RECOVERING INFORMATION COMMUNICATED IN A RADIO COMMUNICATION SYSTEM

[75] Inventors: Douglas Irvin Ayerst, Delray Beach; Malik J. Khan, Boynton Beach; Michael James Rudowicz, Delray Beach, all of Fla.

[73] Assignee: Motorola, Inc., Schaumburg, Ill.

[21] Appl. No.: 404,698

[22] Filed: Mar. 15, 1995

[51] Int. Cl.$^6$ ........................................ H04J 3/26
[52] U.S. Cl. .................. 370/311; 340/825.47; 455/343; 370/312; 370/432; 370/468; 370/471; 370/522
[58] Field of Search ................... 370/83, 82, 92, 370/93, 94.1, 99, 110.1, 110.4, 13, 17; 340/825.47, 825.48, 825.52, 825.53, 825.44; 455/343

[56] References Cited

U.S. PATENT DOCUMENTS

| | | | |
|---|---|---|---|
| 4,427,980 | 1/1984 | Fennell et al. | 340/825.52 |
| 4,519,068 | 5/1985 | Krebs et al. | 370/82 |
| 4,755,816 | 7/1988 | DeLuca | 340/825.44 |
| 4,860,003 | 8/1989 | DeLuca et al. | 340/825.52 |
| 5,128,665 | 7/1992 | DeLuca et al. | |
| 5,282,205 | 1/1994 | Kuznicki . | |
| 5,311,516 | 5/1994 | Kuznicki et al. . | |

*Primary Examiner*—Wellington Chin
*Assistant Examiner*—Huy D. Vu
*Attorney, Agent, or Firm*—James A. Lamb

[57] ABSTRACT

A system controller (102) generates and transmits a radio signal having long messages in data frames (370), and short and long messages in control frames (360). A set of selective call radio addresses is included at the beginning of a control frame (360), each selective call radio address including a subvector which indicates the starting position of a short message or a vector packet within the control frame (360). Vector packets indicate starting positions of long messages within the control frame (360), within other control frames (360), and within data frames (370). A selective call radio (106) receives the radio signal and recovers and processes the short and long messages, using the subvectors and vectors to identify the positions of the short and long messages.

6 Claims, 9 Drawing Sheets

5,644,568

METHOD AND APPARATUS FOR ORGANIZING AND RECOVERING INFORMATION COMMUNICATED IN A RADIO COMMUNICATION SYSTEM

FIELD OF THE INVENTION

This invention relates in general to a method and apparatus for organizing and recovering information communicated in a radio signal, and in particular to an improved technique for identifying a position of a message in a radio signal, in which the message is included in a radio signal transmitted on a different radio channel than a radio signal which includes the address of the selective call radio for which the message is intended.

BACKGROUND OF THE INVENTION

A known technique of organizing information for communication to selective call radios such as pagers in a radio communication system is to arrange the addresses of selective call radios for which message information is included in a predetermined portion of a transmission cycle, such as a frame, at the beginning of the predetermined portion of the transmission cycle in an address field, separated from the message information intended for the selective call radios. This has the advantage of improving the battery life of the selective call radios, because a radio which has no information in the predetermined portion of the transmission cycle can quickly revert to a low power mode as soon as it determines its address is not in the address field.

When the addresses are positioned at the beginning of the predetermined portion of the transmission cycle, the position of the message information intended for the selective call radios must be determined by the selective call radios in order for them to recover the message information. A technique for determining the position of the information is used in the well known FLEX™ protocol of Motorola, Inc. of Schaumburg, Ill. In this protocol a starting position of message information within the predetermined portion of the transmission cycle is indicated by a vector which has a length and position determined on a one for one basis by the length and position of the address associated with the vector. While this protocol works quite well, it has limitations. One limitation is that, as channel arrangements have become more sophisticated, the amount of information required in a vector requires a longer vector than the associated address. Another limitation is that the message information must be within the same predetermined portion of the transmission cycle. This other limitation arises partly from the limitation on the length of the vectors due to their correspondence to the length of the addresses in the FLEX™ protocol.

Thus, what is needed is an improved technique for organizing message information in a radio communication system.

SUMMARY OF THE INVENTION

Accordingly, in a first aspect of the present invention, a method is used in a selective call radio for receiving a radio signal transmitted on a first radio channel. The radio signal has a plurality of messages included in a plurality of control frames and data frames, each of the plurality of messages having an address signal and related message information. Each control frame includes an address field and an information field. The address field of a control frame has a set of address signals. Each of the set of address signals includes a subvector and an address indicating, respectively, a position of a data packet within the control frame and one of a plurality of selective call radios associated with the data packet. The information field follows the address field and has a set of data packets. Each data packet in the set of data packets has the position of the data packet indicated by at least one subvector within the control frame. Each data packet in the set of data packets is one of a vector packet and a short message packet. Vector packets indicate starting positions of long messages within the plurality of control frames and data frames.

The method includes the steps of: receiving the radio signal; determining a presence of a first address within the address field in the control frame received in the radio signal, when the first address matches an embedded address assigned to the selective call radio; determining a first subvector included with the first address; decoding a starting position of a first data packet indicated by the first subvector; recovering the first data packet at the starting position of the first data packet; decoding a starting position of a first long message when the first data packet is a vector packet; and processing the first long message beginning at the starting position of the first long message.

Accordingly, in a second aspect of the present invention, a selective call radio is used for receiving a radio signal transmitted on a first radio channel. The radio signal has a plurality of messages included in a plurality of control frames and data frames. Each of the plurality of messages has an address signal and related message information. Each control frame includes an address field and an information field. The address field of a control frame has a set of address signals. Each of the set of address signals includes a subvector and an address indicating, respectively, a position of a data packet within the control frame and one of a plurality of selective call radios associated with the data packet. The information field follows the address field and has a set of data packets. Each data packet in the set of data packets has the starting position of the data packet indicated by at least one subvector within the control frame. Each data packet in the set of data packets is one of a vector packet and a short message packet. Vector packets indicate starting positions of long messages within the plurality of control frames and data frames.

The selective call radio includes a receiver, an address decoder, a subvector element, a data packet position element, a data packet buffer, a protocol position decoder, and a long message processor. The receiver receives the radio signal. The address decoder, which is coupled to the receiver, determines the presence of a first address within the address field in a control frame received in the radio signal when the first address matches an embedded address assigned to the selective call radio. The subvector element, which is coupled to the receiver and the address decoder, determines a first subvector associated with the first address present within the address field. The data packet position decoder, which is coupled to the subvector element, decodes a starting position of a first data packet indicated by the first subvector. The data packet buffer, which is coupled to the receiver and the data packet position decoder, recovers the first data packet at the starting position of the data packet. The protocol position decoder, which is coupled to the data packet buffer, decodes a starting position of a first long message when the first data packet is a vector packet. The long message processor, which is coupled to the receiver and the protocol position decoder, processes the first long message at the starting position of the long message.

Accordingly, in a third aspect of the present invention, a method is used in a system controller for generating a radio signal transmitted on a first radio channel. The radio signal has short and long messages included in a plurality of control frames and data frames. Each of the short and long messages has an address signal and related message information.

The method includes the steps of generating each address field; generating an information field; assembling each control frame; assembling each data frame; and transferring the control frames and data frames to a transmitter for radio transmission. In the step of generating each address field, each address field of a control frame is generated having a set of address signals. Each of the set of address signals includes an address and a subvector indicating, respectively, a selective call radio for which one of the short and long messages is intended, and a starting position of a data packet within the control frame. In the step of generating an information field, an information field following the address field and having a set of data packets is generated. Each data packet in the set of data packets has the starting position of the data packet indicated by at least one subvector within the control frame. Each data packet in the set of data packets is one of a vector packet and a short message packet. Vector packets indicate starting positions of long messages within the plurality of control frames and data frames. In the step of assembling each control frame, each control frame is assembled including an address field and an information field. In the step of assembling each data frame, each data frame is assembled including a set of long messages. Each long message in the set of long messages has a starting position indicated by at least one vector packet in a control frame.

Accordingly, in a fourth aspect of the present invention, a system controller is used for generating a radio signal transmitted on a first radio channel. The radio signal has short and long messages included in a plurality of control frames and data frames. Each of the short and long messages has an address signal and related message information.

The system controller includes a control frame element, an address field element, an information field element, a data frame element, and a cell site controller. The control frame element assembles each control frame including an address field and an information field. The address field element, which is coupled to an outbound message memory which stores the short and long messages, and which is also coupled to the control frame element, generates an address field of a control frame having a set of address signals. Each of the set of address signals includes an address and a subvector indicating, respectively, a selective call radio for which one of the short and long messages is intended, and a starting position of a data packet within the control frame. The information field element, which is coupled the outbound message memory, the address field element, and to the control frame element, generates an information field following the address field and has a set of data packets. Each data packet in the set of data packets has the starting position of the data packet indicated by at least one subvector within the control frame. Each data packet in the set of data packets is one of a vector packet and a short message packet. Vector packets indicate starting positions of long messages within the plurality of control frames and data frames. The data frame element, which is coupled to the information field element, assembles each data frame including a set of long messages. Each long message in the set of long messages has a starting position indicated by at least one vector packet in a control frame. The cell site controller, which is coupled to the data frame element and the control frame element, transfers the control frames and data frames to a transmitter for radio transmission.

DETAILED DESCRIPTION OF THE DRAWINGS

Figure 1:
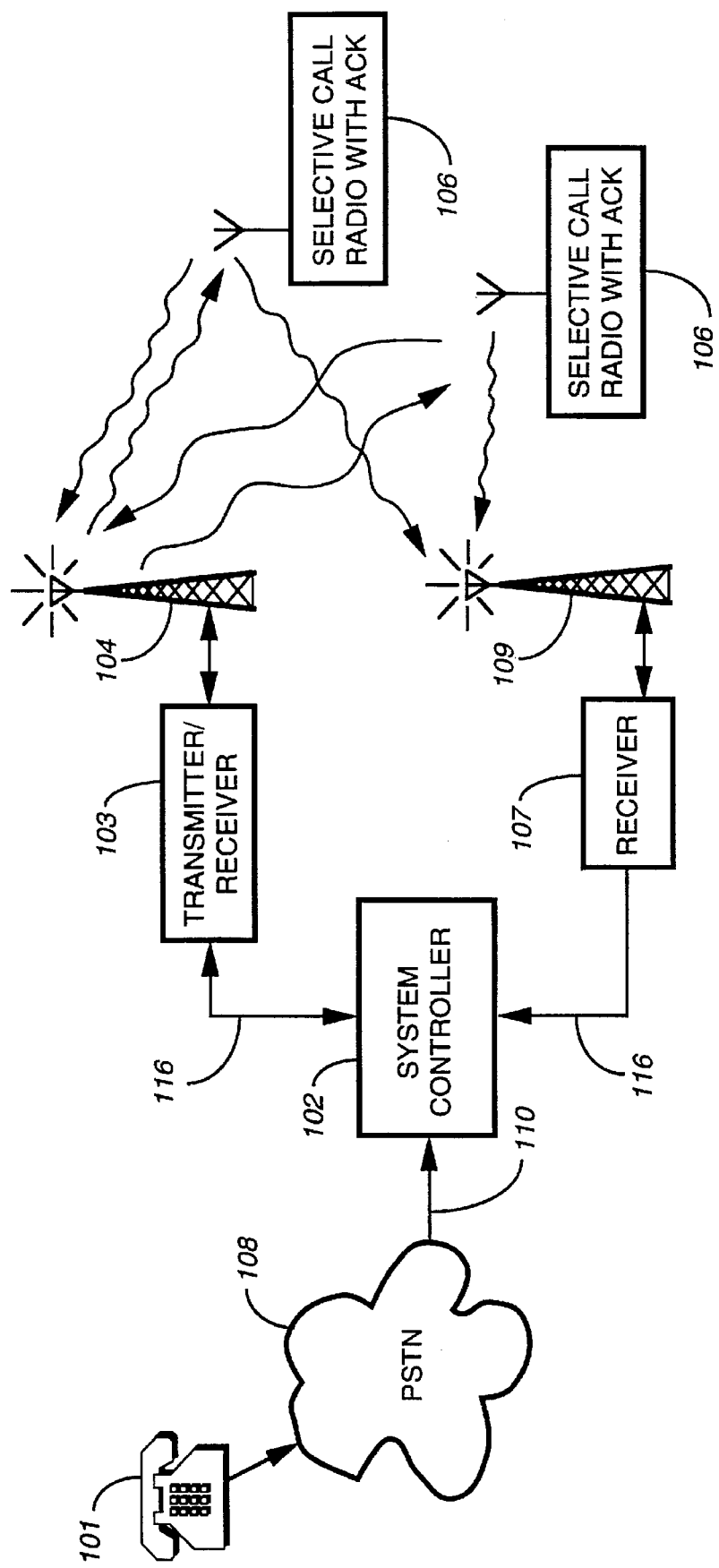
FIG. 1 is an electrical block diagram of a radio communication system, in accordance with a preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101 connected through a conventional switched telephone network (PSTN) 108 by conventional telephone links 110 to a system controller 102. The system controller 102 oversees the operation of at least one radio frequency transmitter/receiver 103 and at least one fixed system receiver 107, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, and response commands, for transmission by the radio frequency transmitter/receivers 103 to a plurality of selective call radios 106. The system controller 102 further functions to decode inbound messages, including unsolicited and response messages, received by the radio frequency transmitter/receivers 103 and the fixed system receivers 107 from the plurality of selective call radios 106.

Examples of response messages are acknowledgments and designated response messages. Designated response messages are communicated in the inbound channel in portions named data units. An acknowledgment is a response to an outbound message initiated at the system controller 102. An example of an outbound alphanumeric message intended for a selective call radio 106 is a page message entered from the telephone 101. The acknowledgment indicates successful reception of the outbound message. A designated response message is a message sent from a selective call radio in response to a command included in an outbound message from the system controller 102. An example of a designated response message is a message initiated by the selective call radio 106, but which is not transmitted until after a response command is received from the system controller 102. The response command, in turn, is sent by the system controller 102 after an inbound message requesting permission to transmit the designated response message is communicated from the selective call radio 106 to the system controller 102. The response messages are preferably transmitted at a time designated within the outbound message or response command, but alternatively can be transmitted using a non-scheduled protocol, such as the ALOHA or slotted ALOHA protocol, which are well known to one of ordinary skill in the art.

An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a designated response and can include data such as alphanumeric, fax, or digitized voice data. Unsolicited messages are transmitted using an ALOHA or slotted ALOHA protocol. The outbound messages are included in outbound radio signals transmitted from a conventional antenna 104 coupled to the radio frequency transmitter/receiver 103. The inbound messages are included in inbound radio signals received by the conventional antenna 104 coupled to the radio frequency transmitter/receiver 103 and the conventional antenna 109 coupled to the fixed system receiver 107.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, 109, and fixed system receivers 107, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 collocated with a conventional radio frequency transmitter.

It will be appreciated that other selective call radio devices (not shown in FIG. 1), such as one and two way pagers, conventional mobile cellular telephones, mobile radio data terminals, mobile cellular telephones having attached data terminals, or mobile radios (trunked and non-trunked) having data terminals attached, are also able to be used in the radio communication system 100. In the following description, the term "selective call radio" will be used to refer to the personal radio telephone, the portable transmitting/receiving device 106, a mobile cellular telephone, a mobile radio data terminal, a mobile cellular telephone having an attached data terminal, or a mobile radio (conventional or trunked) having a data terminal attached. Each of the selective call radios assigned for use in the radio communication system 100 has an address assigned thereto which is a unique selective call address. The address enables the transmission of a message from the system controller 102 only to the addressed selective call radio, and identifies messages and responses received at the system controller 102 from the selective call radio. Furthermore, each of one or more of the selective call radios also has a unique telephone number assigned thereto, the telephone number being unique within the PSTN 108. A list of the assigned selective call addresses and correlated telephone numbers for the selective call radios is stored in the system controller 102 in the form of a subscriber data base.

Figure 2:
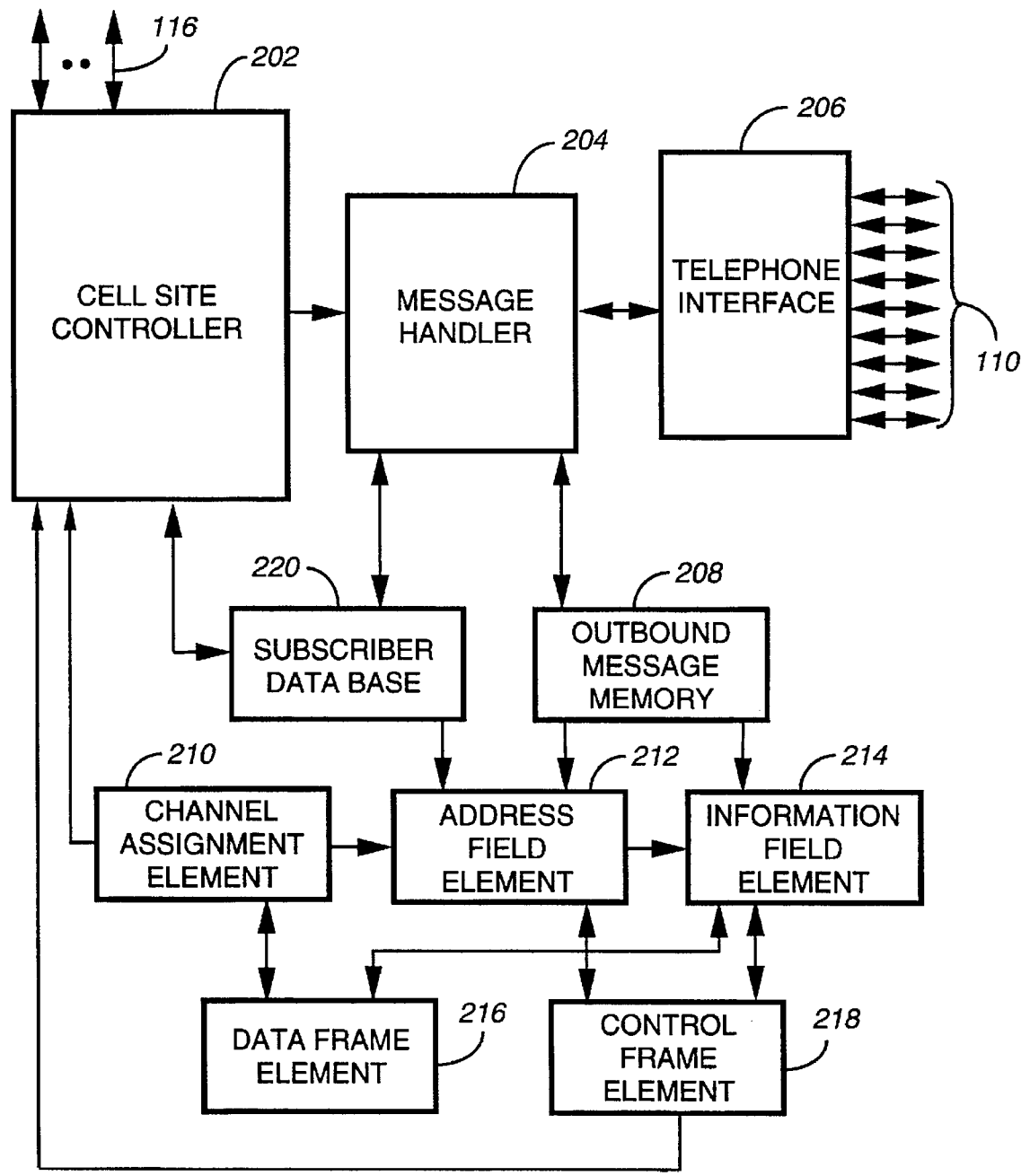
FIG. 2 is an electrical block diagram of a system controller used in the radio communication system, in accordance with a preferred embodiment of the present invention.

Referring to FIG. 2, an electrical block diagram of the system controller 102 is shown, in accordance with the preferred embodiment of the present invention. The system controller 102 comprises a cell site controller 202, a message handler 204, an outbound message memory 208, a subscriber data base 220, a telephone interface 206, a channel assignment element 210, an address field element 212, an information field element 214, a data frame element 216, and a control frame element 218. The cell site controller 202 is coupled to the radio frequency transmitter/receivers 103 (FIG. 1) and fixed system receivers 107 (FIG. 1) by the links 116. The cell site controller 202 couples outbound messages including selective call addresses to the transmitter/receivers 103 and controls the transmitter/receivers 103 to transmit transmission cycles which include the outbound messages. The cell site controller 202 also processes inbound messages from the selective call radios 106. The inbound messages are received by the transmitter/receivers 103 and fixed system receivers 107, and are coupled to the cell site controller 202. The message handler 204, which routes and processes messages, is coupled to the telephone interface 206, the subscriber data base 220, and the outbound message memory 208. The telephone interface 206 handles the switched telephone network 108 (PSTN) (FIG. 1) physical connection, connecting and disconnecting telephone calls at the telephone links 110, and routing the audio signals between the telephone links 110 and the message handler 204.

The subscriber data base 220 stores information for each subscriber, including a correlation between a selective call address assigned to each selective call radio 106 and the telephone number used within the PSTN 108 to route messages and telephone calls to each selective call radio 106, as well as other subscriber determined preferences, such as hours during which messages are to be held back from delivery to the selective call radio 106. The outbound message memory 208 is for storing a queue of messages which are queued for delivery to at least one of the plurality of selective call radios 106, wherein each message of the queue of messages is associated with a selective call address, also stored in the outbound message memory 208, of one of the plurality of selective call radios 106 for which each message is intended. The message handler 204 schedules outbound messages and the selective call addresses associated therewith within a transmission cycle. The message handler 204 also determines response schedules for response messages which minimize contention of messages at transmitter/receivers 103 and fixed system receivers 107, and includes response timing information in outbound messages so that selective call radios 106 will respond according to the response schedule. The message handler 204 identifies an inbound message as being a response message associated with one of the selective call radios in the subscriber data base 220, identifies the response message as being associated with one of the outbound messages in the outbound message memory 208. The message handler 204 then further processes the outbound and response messages according to their content. The cell site controller 202, the message handler 204, the outbound message memory 208, the subscriber data base 220, and the telephone interface 206, are conventional elements of the system controller 102.

As one example of an operation of the system controller 102, the delivery of an outbound message stored in the outbound message memory 208 is completed when the outbound message has been communicated to the intended selective call radio 106, the message is presented on a display of the selective call radio 106 by a user action, a message response is communicated back to the system controller 102 from the selective call radio 106, and the message response is identified by the message handler 204 as being a user acknowledgment generated by the selective call radio 106 specifically for the outbound message. In this example, the message handler 204 generates another message which is sent to the originator of the outbound message to notify the originator that the message has been acknowledged by the selective call radio 106.

Unique functions of the system controller 102 in accordance with the preferred embodiment of the present invention are included in the channel assignment element 210, the address field element 212, the information field element 214, the data frame element 216, and the control frame element 218.

The address field element 212 is coupled to the subscriber data base 220, the outbound message memory 208, the information field element 214, and the control frame element 218. The information field element 214 is further coupled to the outbound message memory 208 and the control frame element 218. The control frame element 218 is further coupled to the cell site controller 202. The channel assignment element 210 is coupled to the data frame element 216. The address field element 212 recovers messages from the outbound message memory 208 which have been scheduled for transmission in an upcoming transmission cycle. The address field element 212 determines, for each recovered message, the associated selective call address (from the subscriber data base 220) and the length of the message. The length of the message is coupled to the information field element 214.

When the message information is one of a set of predetermined short messages, for example an acknowledgment or a response command, or when the message information is less than a first predetermined length, which in this example is three words long, the message is coupled by the information field element 214 to the control frame element 218 for inclusion as a short message packet into an information field of a control frame being assembled by the control frame element 218 at a starting position within the control frame. The control frame element 218 couples the starting position of the short message to the address field element 212, which generates a subvector associated with the selective call address and which indicates the starting position. The length of each short message which is in the set of predetermined short messages is indicated within each predetermined message, and is less than a second predetermined length, which in this example is nine words long. In accordance with the preferred embodiment of the present invention, for example, short messages which command a selective call radio 106 to perform an automatic repeat request are of variable length of from 4 to 8 words long depending on a number of predetermined length response data packets that the selective call radio 106 is being commanded to retransmit. The length of each short message which is not in the set of predetermined messages is included in each short message by the control frame element 218. The selective call address with the subvector is then coupled to the control frame element 218 and assembled by the control frame element 218 into an address field of the same control frame in which the short message packet is located.

When the message information is not one of the set of predetermined short messages, or has a length equal to or more than the first predetermined length, the message is coupled by the information field element 214 to the data frame element 216 for inclusion as a long message packet into an information field of a control frame or a data frame being assembled, respectively, by the control frame element 218 or the data frame element 216 at a starting position within the control frame or data frame. The control frame element 218 or data frame element 216 couples the starting position of the long message within the control or data frame and the length of the long message to the information field element 214, which generates a vector packet which is coupled to and included by the control frame element 218 in the information portion of the control frame. The vector, which is less than a third predetermined length, which in this example is less than six words long, indicates the starting position and the length of the long message. The control frame element 218 couples the starting position of the vector packet within the control frame to the address field element 212, which generates a subvector associated with the selective call address which indicates the starting position of the vector packet. The selective call address with the subvector is then assembled by the control frame element 218 into an address field of the same control frame which includes the vector packet.

When the radio communication system 100 comprises more than one forward channel, as for example, in a system having three radio frequencies usable for simultaneous broadcasting of radio signals, the channel assignment element 210 schedules data frames for transmission on one of the plurality of forward channels. In this situation, the data frame element 216 couples to the information field element 214 an indication of which channel the data frame will be transmitted on as a part of the starting position of the long message, for inclusion in the vector packet generated by the control frame element 218.

It will be further appreciated that for improved battery life in the selective call radios 106, selective call addresses for messages intended for a particular selective call radio 106 are included in a control frame which is at a predetermined position of a transmission cycle, so that the selective call radio 106 need only go into a normal power mode at the beginning of the predetermined control frame.

System controller 102 is preferably a model MPS2000® paging terminal manufactured by Motorola, Inc., of Schaumburg Ill., modified with unique firmware elements in accordance with the preferred embodiment of the present invention, as described herein. The cell site controller 202, the message handler 204, the outbound message memory 208, the subscriber data base 220, the telephone interface 206, the channel assignment element 210, the address field element 212, the information field element 214, the data frame element 216, and the control frame element 218 are preferably implemented within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 220 and the outbound message memory 208 can alternatively be implemented as magnetic or optical disk memory, which can alternatively be external to the system controller 102.

Figure 3:
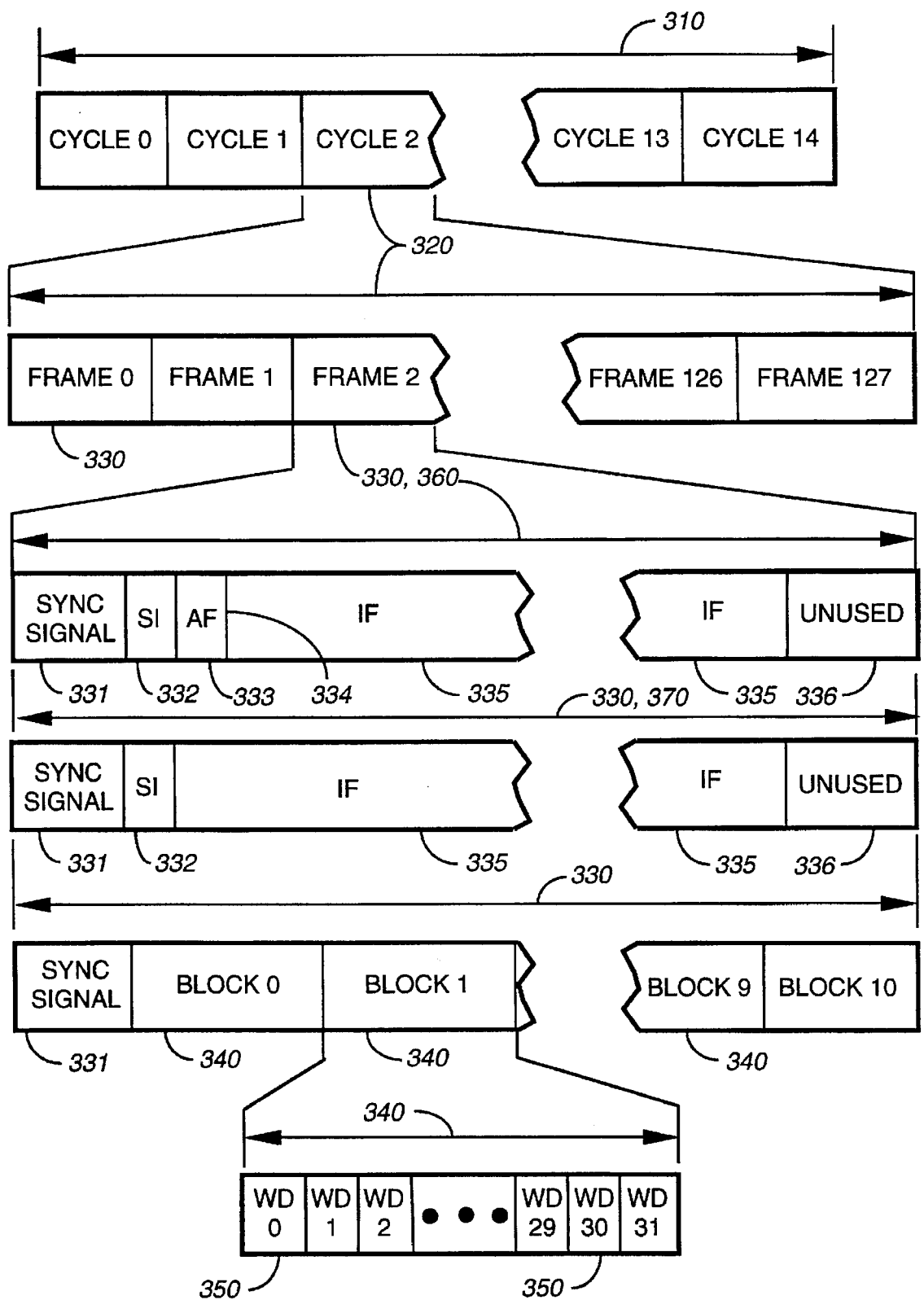
FIGS. 3, 4, and 5 are timing diagrams of frames included in a radio signal transmitted by a transmitter in radio communication system, in accordance with a preferred embodiment of the present invention.

Referring to FIG. 3, a timing diagram illustrating features of the transmission format of an outbound signaling protocol utilized by the radio communication system of FIG. 1 to transmit a message from the system controller 102 to the selective call radio 106 is shown, in accordance with the preferred embodiment of the present invention. The signaling protocol is similar to the FLEX™ protocol, which is a synchronous outbound signaling protocol. The signaling protocol is subdivided into protocol divisions, which are an hour 310, a cycle 320, a frame 330, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the frames 330. Bit rates of 1600 bits per second (bps), 3200 bps, or 6400 bps are usable during each frame 330. The bit rate of each frame 330 is communicated to the selective call radios 106 during the synchronization signal 331. When the bit rate is 1600 bps, 8 thirty two bit uniquely identified words 350 are transmitted in each block 340. For bit rates of 3200 bps or 6400 bps, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the burst error correction capability of the protocol. The transmission cycle referred to above in the description of the system controller 102 with reference to FIG. 2 comprises a cycle 320.

A frame 330 is further defined to be one of two specific types depending upon the information found within the frame 330. The first type of frame 330 is a control frame 360. The second type of frame 330 is a data frame 370.

Information is included in each control frame 360 in fields, comprising system information in a system information field (SI) 332, one or more selective call addresses with subvectors in an address field (AF) 333, one or more of a set of vector packets, short message packets, and long messages in the information field (IF) 335, and an unused field 336 having no useful information therein. Each vector packet and short message packet in the information field 335 of a control frame 360 corresponds to at least one of the addresses in the address field 333 of the same control frame 360. Each long message in the information field 335 corresponds to at least one vector packet in the information field 335 of at least one or more control frames 360. The boundaries of the fields 332, 333, 335, 336 are defined by the words 350, not by the blocks 340, and the length of the fields 332, 333, 335, 336 are variable, depending on factors such as the type of system information included in the system information field 332, the type of addresses used, and the amount of information in each message. In particular, the boundary between the address field 333 and the information field 335 is referred to as the address field boundary 334. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call radio 106 are preferably scheduled for transmission in a predetermined one or more of the frames 330 of each cycle 320, so as to allow the particular selective call radio 106 to go into a low power mode during other frames when short messages and vectors are not included for the particular selective call radio 106.

Information is included in each data frame 370 in fields, comprising system information in a system information field (SI) 332, and long messages in the information field (IF) 335, and an unused field 336 having no useful information therein. Each long message in the information field 335 corresponds to at least one vector packet in the information field 335 of at least one or more control frames 360. The boundaries of the fields 332, 335, 336 are defined by the words 350, not by the blocks 340, and the length of the fields 332, 335, 336 are variable, depending on factors such as the type of system information included in the system information field 332, and the amount of information in the long messages.

The vectors contain information which specifies the starting word of a long message, in terms of the protocol divisions described above, and additionally, radio channel information such as radio channel frequency, subchannel offset from the radio channel frequency, side band, and in-phase or quadrature channel. The starting position and length of a long message, a short message, or a vector packet define the protocol position of the long message, short message, or vector packet. The protocol position can be on a different radio channel and in a different division (i.e., cycle, frame, block) of the protocol.

When a selective call radio 106 detects its address with subvector within a control frame 360, the selective call radio 106 is typically directed by the subvector to receive one of a vector packet or a short message packet within the control frame 360 wherein the address with subvector is detected. (In a limited number of cases, the address can include all the information needed to be conveyed to the selective call radio 106 in the form of a predetermined pattern of the subvector bits which are not used for position indication within the control frame 360, but rather for a limited number of messages having low information content. An example is an acknowledgment to an inbound message from the selective call radio 106)

When a selective call radio 106 decodes a vector packet in a control frame 360 which is associated with its selective call address, the selective call radio 106 is directed to receive and decode a long message in either the same control frame 360, or another control frame 360, or a data frame 370. The frame 330 in which the selective call radio is to receive the long message is in a radio signal transmitted in either a first radio channel where the selective call radio 106 detects its address with subvector, or a second channel different than the channel where the selective call radio detects its address with subvector.

Figure 4:
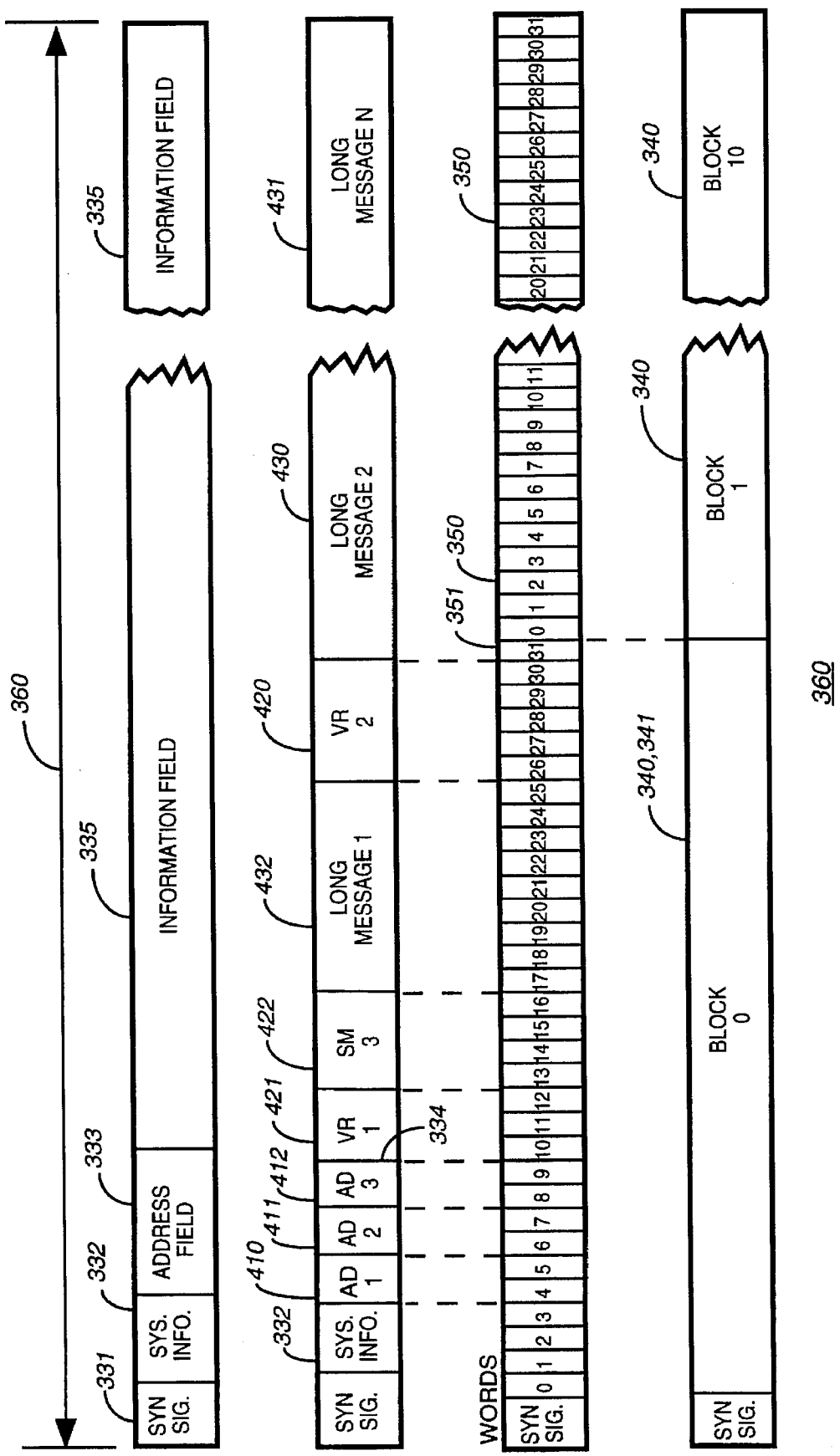

Referring to FIG. 4, a timing diagram illustrating a portion of a control frame 360 of the outbound signaling protocol utilized by the radio communication system of FIG. 1 is shown, in accordance with the preferred embodiment of the present invention. The diagram shows the synchronization signal 331, the system information field 332, the address field 333, and a portion of the information field 335. Three addresses 410, 411, 412, three data packets 420, 421, 422, a first long message 432, a second long message 430, and an Nth long message 431 are shown in FIG. 4. The three data packets 420, 421, 422 include two vector packets 420, 421 and a short message packet 422. The addresses 410, 411, 412 are addresses with subvectors, of selective call radios 106. Each of the addresses 410, 411, 412 comprises two words (32 bits each) and includes 8 bits of subvector information, which indicates a starting position of a vector or short message packet within the same control frame 360. The position is indicated as a number of words from the address boundary 334. It will be appreciated that by using eight bits for each subvector, the subvector can indicate a data packet starting position up to two hundred fifty six words after the address boundary 334. The total number of words in a frame sent at the highest data rate is three hundred fifty two words, and with typical information included in the system information field 332 and the address field 333, a subvector can point to a worst case (shortest) long message at the end of a frame in all but very unusual cases. It will be appreciated that the number of bits reserved for the subvector in similar protocols could be more or less, depending on the exact definition of protocol divisions.

The three data packets 420, 421, 422 are associated, respectively, with the three addresses 410, 411, and 412. There is no size limitation placed on the data packets 420, 421, 422 that are associated with any of the addresses 410, 411, 412, but the data packets 420, 421, 422 are preferably less than six words long. The system controller 102 preferably uses vector packets for minimizing the number of long messages in the control frames, thereby reducing the average number of control frames 360 required in each cycle of the radio signal, in order to improve the efficiency of message throughput in the radio communication system 100 and to provide improved battery life in the selective call radios 106, and by allowing long messages to be sent on radio channels other than the radio channel used for the control frame 360. Thus, in situations in which the starting position of a long message is more complicated (such as a subchannel of another radio channel in a different cycle), a longer vector packet 420, 421 is justified than for simpler situations. Data packets are used to convey small amounts of information, including predetermined messages which are used repetitively, such as messages which direct a selective call radio 106 to respond with information on a designated inbound radio channel at a designated starting position and messages which request information from a selective call radio 106, such as the amount of message memory remaining.

There is no unique ordered one to one correspondence of position within the information field 335 associating any address 410, 411, 412 with a corresponding data packet 420, 421, 422. Each of the vector packets 420, 421 has information that identifies the starting position and length of a long message, not necessarily in the same control frame 360, and each vector packet is associated with one or more respective addresses 410, 411, 412 in the same control frame 360. The starting position is identified by the starting word of the long message. For example, vector packet 420 has information that indicates that message two 430, which is intended for selective call radio 106 having selective call address 411, is located starting at word thirty one 351 of block zero 341 of the frame 360, and is thirteen words long. A long message can be communicated to more than one selective call radio 106, for example to two selective call radios 106, by including an address for each of the two selective call radios 106 in the address field 333 of one or more control frames 360, and having the vector packets associated with each address indicate the same long message position. Alternatively, two or more addresses in the same control frame 360 could have subvectors set so as to indicate the same vector packet which then indicates one long message. It will be appreciated that, due to the interleaving mentioned above, the starting position (that is, the starting word) of an address or vector or message in the described protocol is not necessarily a sequential timing position (for example, all bits of word 7 in a block 340 may not precede all bits of word 8) because the bits of the words are interleaved, but starting position is a unique identifier nonetheless.

It will be appreciated by one of ordinary skill in the art that by embedding a short, eight bit subvector along with address bits of a selective call radio 106 in order to create the addresses 410, 411, 412, each of which includes a subvector, which in turn is used to direct the selective call radio 106 to the starting position of one of either a short message packet or a vector packet within the control frame 360, wherein the vector packet is in turn able to command the selective call radio 106 to receive long messages in the current or other control frames 360 or data frames 370 in any protocol position, the system controller 102 is able to have considerable latitude and thereby improve the efficiency of message scheduling and channel packing over prior art methods of assembling information for transmission.

It will be further appreciated that the unique use of data packets which are free from predetermined relationships with addresses found in prior art systems, and which can have variable lengths, allow for growth of the number of repetitively used predetermined short messages and for flexibility of protocol design for large radio communication systems 100, while remaining compatible with older model selective call radios 106.

Figure 5:
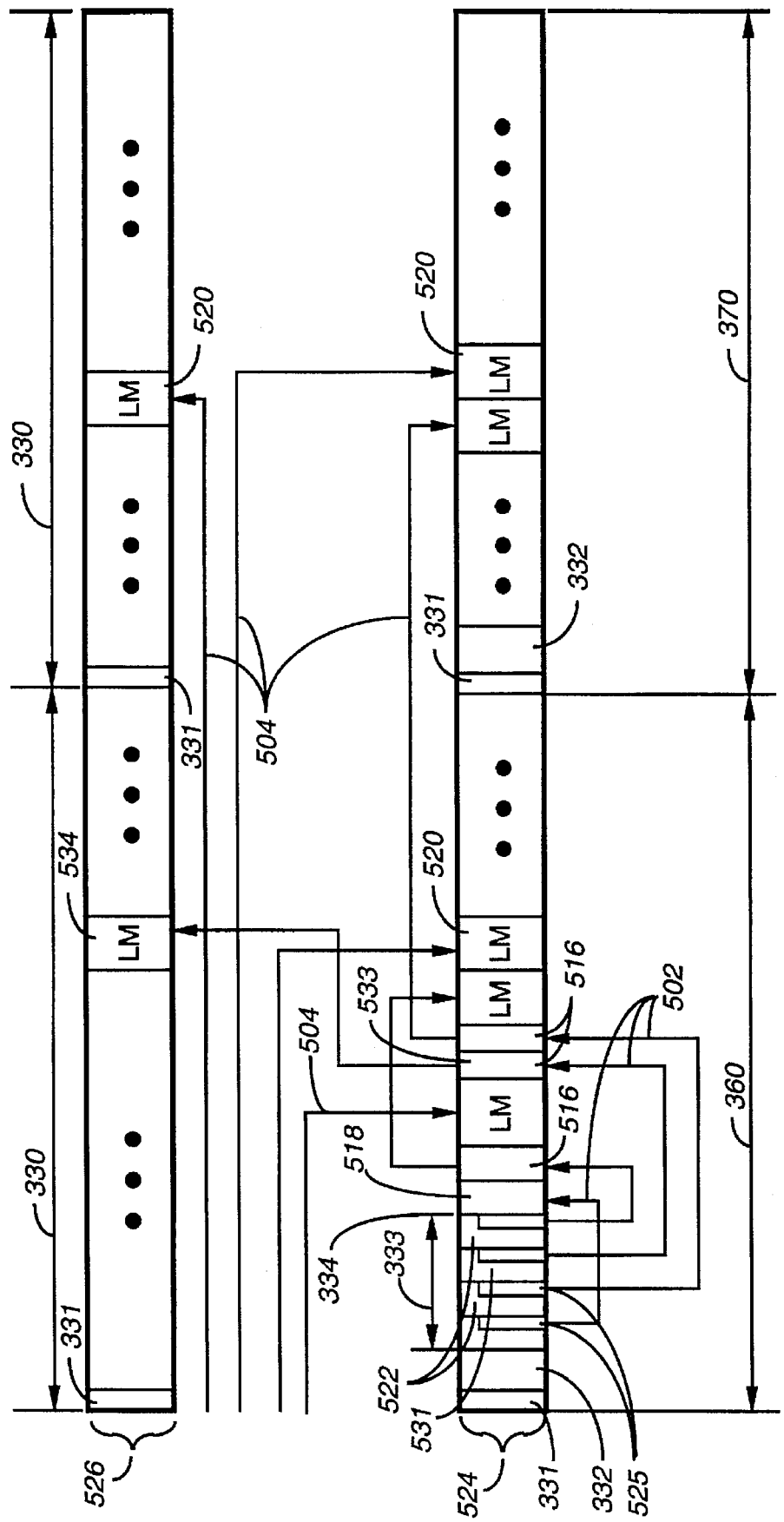

Referring to FIG. 5, a timing diagram illustrating portions of cycles 320 of the outbound signaling protocol utilized by the radio communication system of FIG. 1 is shown, in accordance with the preferred embodiment of the present invention. In a control frame 360 transmitted in a signal 524 on a first radio channel, the diagram illustrates the synchronization signal 331, the system information field 332, the address field 333 including four addresses 522 with subvectors 525, and a portion of the information field 335 (not identified in FIG. 5). Vector packets 516, a short message packet 518 and long messages 520 are illustrated within the information field 335 of the control frame 360. The diagram in FIG. 5 illustrates the first signal 524 transmitted on the first radio channel and a second signal 526 transmitted on a second radio channel synchronously with the first signal 524. Both the first signal 524 and the second signal 526 include control frames 360 and/or data frames 370 as determined by the system controller 102. The indications of the starting positions of vector packets 516 and the short message packet 518 by the subvectors 525 within the same control frame 360 and within the same radio channel 524 are illustrated by the arrowed lines 502. The indications of the starting positions of the long messages 520 by vector packets 516 included in the first signal 524 or by vector packets 516 included in prior control frames 360 are illustrated by arrowed lines 504. The data frame 370 that is illustrated in the first signal 524 includes the frame synchronization 331, the system information 332 and long messages 520. The two frames that are associated with the second signal 526 can be either control frames 360 or data frames 370. For the purpose of this illustration the only contents of these frames 330 that are shown are the synchronization signal 331 and long messages 520.

It will be appreciated that when a selective call radio 106 has the capability to store more than one frame 330 before processing the stored frames to recover the information intended for the selective call radio 106, the system controller 102 can include a long message 520 in a frame 330 being transmitted before or after the control frame 360 which includes the vector packet which indicates the protocol position of the long message 520. It will be further appreciated that each subvector indicates the starting position of one of a vector packet and a short message packet, while the position of each of a vector packet and a short message packet can be indicated by more than one subvector. Similarly, each vector indicates the starting position of a long message, while the position of each long message can be indicated by more than one vector. This increases throughput efficiency over prior art systems which require one vector for each address.

It will be further appreciated that vector packets are of various lengths depending on the type and protocol position of the long messages to which the vector packets reference. For example a long message containing hexadecimal or binary data typically requires delivery of information within the vector packet which specifies encryption and compression techniques used when processing the long message data in the selective call radio 106. Simple alphanumeric long message fields may require no such information and hence their associated vector packets may be shorter. In addition, the length of a vector packet will vary depending on whether or not reverse channel transmissions or other responses are required by the selective call radio 106 to which the forward channel message is directed.

The ability to partition actual message data that is contained in a long message from the variable amount of information that is required for routing and processing the long message (this variable amount of information is contained in the variable length vector packet) is an advantage provided by this invention. Variable length vector packets allow flexibility and ease of software construction in both the selective call radio 106 for receiving the message information and in the system controller 102 for formatting and scheduling message transmissions.

Figure 6:
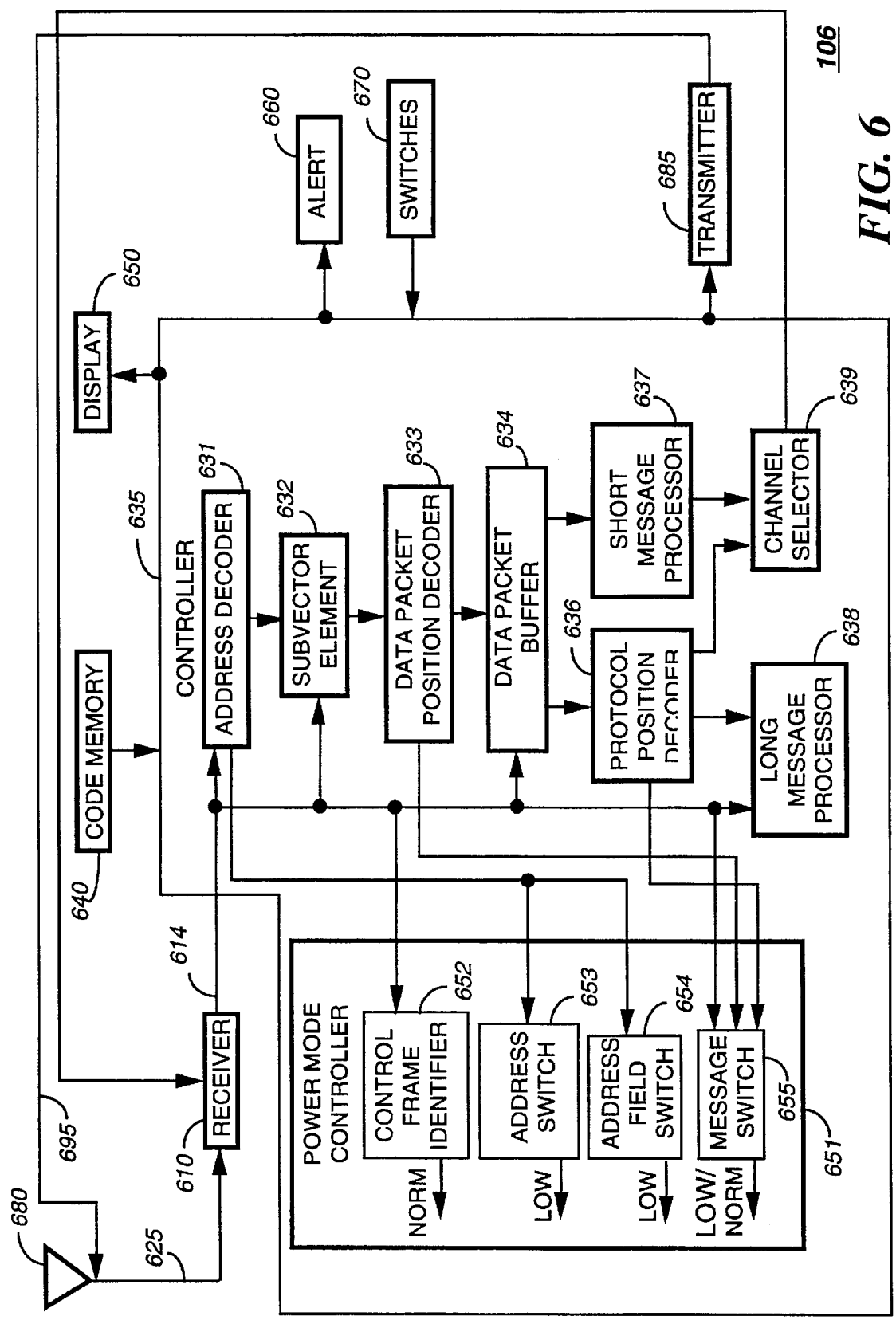
FIG. 6 is an electrical block diagram of a selective call radio used in the radio communication system, in accordance with a preferred embodiment of the present invention.

Referring to FIG. 6, an electrical block diagram of a selective call radio 106 with inbound messaging capability is shown, in accordance with the preferred embodiment of the present invention. The selective call radio 106 includes an antenna 680 for intercepting and transmitting radio signals. The intercepted signal 625 in this example includes the control frame 360 illustrated in FIG. 5, which is transmitted at a predetermined protocol position and which includes the selective call address 531 (FIG. 5) of the selective call radio 106. Also in this example, a long message 534 (FIG. 5) is included in a data frame 370 in the second signal 526 (FIG. 5) intended for reception by the selective call radio 106. Long message 534 is a text message intended for presentation on display 650. The antenna 680 is coupled to a conventional receiver 610 and a conventional transmitter 685. The receiver 610 and the transmitter 685 are coupled to a controller 635. The controller 635 is coupled to a code memory 640, a display 650, an alert 660, and a set of switches 670. The controller 635 comprises an address decoder 631, a subvector element 632, a data packet position decoder 633, a data packet buffer 634, a protocol position decoder 636, a short message processor 637, a long message processor 638, a channel selector 639, and a power mode controller 651. The power mode controller 651 comprises a control frame identifier 652, an address switch 653, an address field switch 654, and a message switch 655. Just prior to receipt of the synchronization signal 331 of the control frame 360, at the predetermined protocol position within the cycle 320, the control frame identifier 652 switches a power mode of the selective call radio 106 to a normal power state, in which the receiver 610 begins receiving radio signals. The intercepted signal 625 is coupled to the receiver 610 wherein the intercepted signal 625 is received, which includes filtering to remove undesirable energy at off channel frequencies, amplification of the filtered signal, frequency conversion of the signal 625, and demodulation of the signal 625 in a conventional manner. The receiver 610 thereby generates a demodulated signal 614 which is coupled to a controller 635. The demodulated signal 614 is coupled to the address decoder 631, the subvector element 632, the data packet buffer 634, the long message processor 638, the message switch 655, and the control frame identifier 652.

The demodulated signal 614 includes the information transmitted in the frames 360, 370 of this example in the form of data symbols, including the long message 534, with errors possibly induced during the radio communication of the signal. The controller 635 recovers bits from the data symbols received at a predetermined outbound data rate in the demodulated signal 614 and performs decoding of the binary information for recovering digital portions of the frames 360, 370 such as the address field 333, data packets, and digital long messages using error correction and detection techniques well known to one of ordinary skill in the art. The controller 635 is coupled to a code memory 640, in which is stored one or more addresses assigned to the selective call radio 106, such as a local address (used in a "home" portion of the radio communication system 100), a "roaming" address (used in other portions of the radio communication system 100), and a group address (shared with other "home" selective call radios 106). The assigned address(es) are also referred to herein as the embedded addresses. When the controller 635 determines that the address field 333 of the control frame 360, which includes the selective call address 531 (FIG. 5), is sufficiently error free the controller 635 couples the address field 333 to the address decoder 631 which compares each outbound selective call address in the control frame 360 to the embedded addresses. When none of the outbound selective call addresses in the recovered control frame 360 match any embedded selective call address before the address boundary 334 (FIGS. 3, 4, and 5), the address field switch 654 puts the selective call radio 106 into a low power mode in which the selective call radio 106 cannot receive radio signals, and the controller 635 ceases further processing of the demodulated signal 614 until a later time when a subsequent control frame 360 is transmitted at a predetermined position which potentially includes a selective call address for the selective call radio 106.

When any outbound selective call address in the recovered control frame 360 and an embedded selective call address match, a valid address signal is coupled to the subvector element 632, which responds by recovering the subvector portion of the address, and coupling it to the data packet position decoder 633. The data packet position decoder 633 determines the starting position of the data packet 533 (FIG. 5) as a number of words from the address boundary 334, and couples it to the data packet buffer 634. The data packet position decoder 633 further couples a data packet position signal to the message switch 655 which in response switches the selective call radio 106 to the low power mode until the starting position of the data packet, at which time the message switch 655 switches the selective call radio 106 to the normal power mode. The duration of the data packet 533 is determined by the message switch from information within the data packet, and the message switch 655 switches the power mode to the low power mode at the end of the data packet. During the low power mode, processing of message information continues, but signal reception does not. In response to the starting position, the data packet buffer 634 stores the data packet recovered at the protocol position of the data packet 533. The data packet buffer 634 determines whether the data packet is a short message packet or a vector packet, and accordingly couples the packet information to either the short message processor 637 or the protocol position decoder 636. When the data packet is a short message packet the short message processor 637 processes the short message packet, as for example, when the short message packet is an acknowledgment message, by completing a transmission cycle of the inbound message being acknowledged. In the case of the example being used herein, the data packet 533 is a vector packet. The protocol position decoder 636 decodes the starting position of the long message 534, which includes in this example an indication that the long message 534 is in the same frame position as the control frame 360, but in the second signal 526.

The protocol position decoder 636 generates a channel indicator for the second signal 526 which is coupled to the channel selector 639, and couples the decoded starting position of the long message 534 to the long message processor 638 and the message switch 655. The message switch 655 switches the power mode of the selective call radio 106 to the normal power mode, the channel selector 639 switches the receiving frequency of the receiver 610 to the frequency of the second signal, and the long message processor 638 recovers the long message 534 during the protocol position determined from the starting position determined from the vector packet 533 and the length of the long message. The length of the long message is determined by the message switch from information in the long message in the demodulated signal 614. At the end of the long message, the message switch 655 switches the power mode of the selective call radio 106 to the low power mode.

It will be appreciated that the vector packet for a long message may be used to direct a selective call radio 106 to receive a long message on another channel (or at a different time on the same channel) that is substantially different in signaling format from the format of the control frame 360. For example, a selective call radio 106 can be vectored from a synchronous control frame 360 as described above to a radio channel that contains only Post Office Committee Standardization Advisory Group (POCSAG) formatted one way asynchronous paging signaling. In this particular instance, the vector contained in the control frame 360 directs the selective call radio 106 to switch to the POCSAG channel and to continue to decode the asynchronous POCSAG signaling format until it receives a POCSAG page. After receiving the POCSAG page it switches back to resume the normal operation of decoding the synchronous control channel in those control frames wherein the address of the selective call radio 106 will appear. Note that in this example the selective call radio 106 would not have decoded the asynchronous POCSAG signaling format unless it had been directed to do so by the system controller 102 by way of the vector packet in the synchronous control frame 360.

It will be further appreciated that the protocol position of the data packets could be entirely conveyed, alternatively, by information solely within the subvectors by including the length in the subvectors instead of having the starting position in the subvectors and the lengths within the data packets, but that this alternative technique requires longer subvectors. Conversely, it will be appreciated that the protocol position of the long messages could be conveyed by including only the starting position in the vector and the length in the long messages, which would shorten the vectors, but the length information of the long message is typically not a substantial proportion of the vector information.

The controller 635 is coupled to a set of switches 670, to which the controller 635 is responsive for setting and controlling a plurality of operational modes of the selective call radio 106. Depending on the operational mode of the selective call radio 106, and depending on the contents of the long message 534, the controller 635 couples information included in the long message 534 to a display 650 for presentation and stores information included in the long message 534 for later presentation. Also depending on the operational mode of the selective call radio 106, a sensible alert device 660, for example, a tone alert device or a vibration alert device, is activated in response to the alert signal.

It will be appreciated that any of the long messages included in the radio signal can include analog message information instead of digital information. In this situation, the analog information is preferably coupled from the system controller 102 to the transmitter/receiver 103 in the form of digitized analog information, for example adaptive differential pulse code modulated (ADPCM) digitization, where it is transformed back into an analog signal used to modulate the radio signal. At the selective call radio 106, the analog demodulated signal 614 is preferably ADPCM digitized and processed by the controller 635 which implemented, at least in part, as a digital signal processor. The analog long message can be a compressed voice message, in which case the analog message is stored until presentation to a user, at which time the ADPCM data is converted back to an analog signal which is coupled to a speaker (not shown in FIG. 6) for conversion to an audible voice message.

In this example, upon determining that the long message 534 includes a text message, the controller 635 couples the text message to the display 650 and generates an encoded acknowledgment message. The acknowledgment message is coupled to the transmitter 685, which generates an RF transmit signal 695. The RF transmit signal 695 is coupled to the antenna 680 and transmitted.

The receiver 610 in the preferred and alternate embodiments of the present invention in FIG. 6 is preferably a conventional dual conversion receiver of a type well known to those skilled in the art, but can alternatively be of other conventional types, such as a single conversion or zero intermediate frequency (ZIF) receiver. The code memory 640 is conventional EPROM, or conventional SRAM or another conventional memory type which is well known to those skilled in the art. The display 650 is an LCD display of a type well known to those skilled in the art, and the antenna 680, switches 670, and alert device 660 are devices also well known to those skilled in the art. The controller 635 is preferably implemented within a controller section which includes, but is not limited to conventional hardware circuits including a microprocessor, timing circuits, random access memory, non-volatile memory such as EPROM, and input/output circuitry. The unique functions of the address decoder 631, the subvector element 632, the data packet position decoder 633, the data packet buffer 634, the protocol position decoder 636, the short message processor 637, the long message processor 638, the channel selector 639, the power mode controller 651, the control frame identifier 652, the address switch 653, the address field switch 654, and the message switch 655, as described herein are controlled by unique firmware routines developed in accordance with techniques well known to one of ordinary skill in the art. The microprocessor is preferably one of the 68HC05 family microprocessors made by Motorola, Inc. of Schaumburg, Ill. The transmitter 685 is a conventional low power transmitter of a type well known to those skilled in the art.

Figure 7:
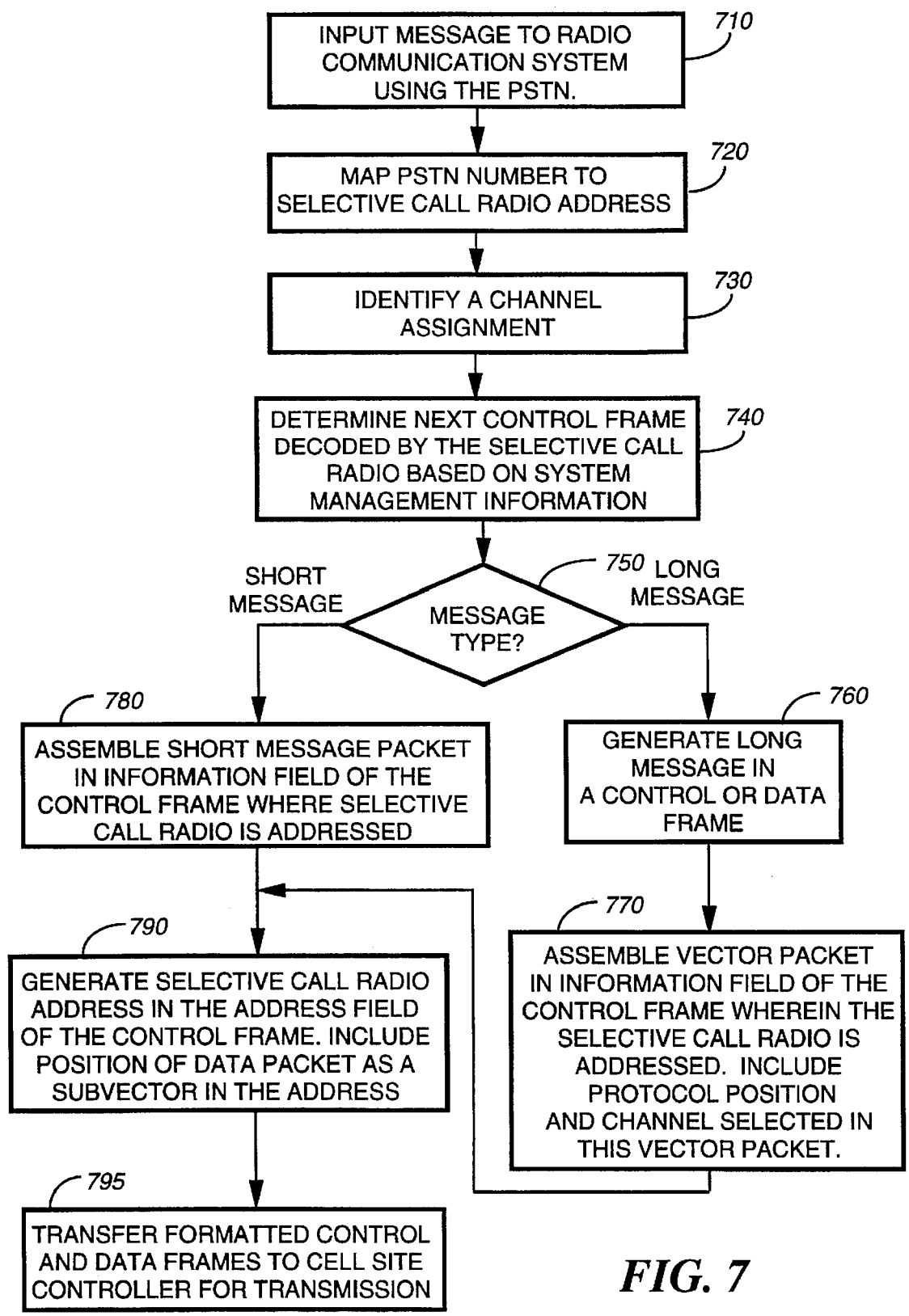
FIG. 7 shows a flow chart of a method used in the system controller, in accordance with a preferred embodiment of the present invention.

FIG. 7 shows a flow chart which illustrates a method used in a system controller 102 of the radio communication system 100 for generating a forward channel radio signal transmitted on a radio channel, in accordance with the preferred embodiment of the present invention. At step 710, a message is input to the radio communication system using the Public Switched Telephone Network (PSTN) 108. The PSTN number is mapped to a selective call radio address, at step 720, using the subscriber database 220. At step 730, a channel assignment is identified among one of the radio channels in operation in the radio communication system 100. The channel assignment is based on the selective call radio's address and a predetermined algorithm which, for example, identifies a predetermined default channel for each selective call radio 106.

At step 740, the next predetermined control frame 360 which will be decoded by the selective call radio is determined by the system controller 102. The control frame determination is based on the selective call radio's address and system management information. The input message type is determined at step 750. When the input message is a short message, it is assembled in the information field of the next control frame 360, at step 780. The address of the selective call radio 106 is included in the same control frame 360 as the one containing the short message. The starting position of the short message packet is stored in the system controller 102. When the input message is a long message, it is generated in the information field of control or data frames which will be transmitted in one of the radio channels present in the radio communication system 100, at step 760. The starting position of the long message is stored. At step 770, a vector packet is assembled in the information field of the control frame in which the selective call radio is addressed. The starting position of the long message and the channel assigned for transmission of the long message, are included in the vector packet. The starting position of the vector packet is stored.

At step 790, the selective call radio address is generated in the address field of the control frame. The position of the data packet (short message packet or vector packet), is included as a subvector in the selective call radio's address. At step 795, the formatted control and data frames containing addresses and messages for selective call radios are transferred to the cell site controller 202 for transmission by the radio transmitter/receiver 103.

Figure 8:
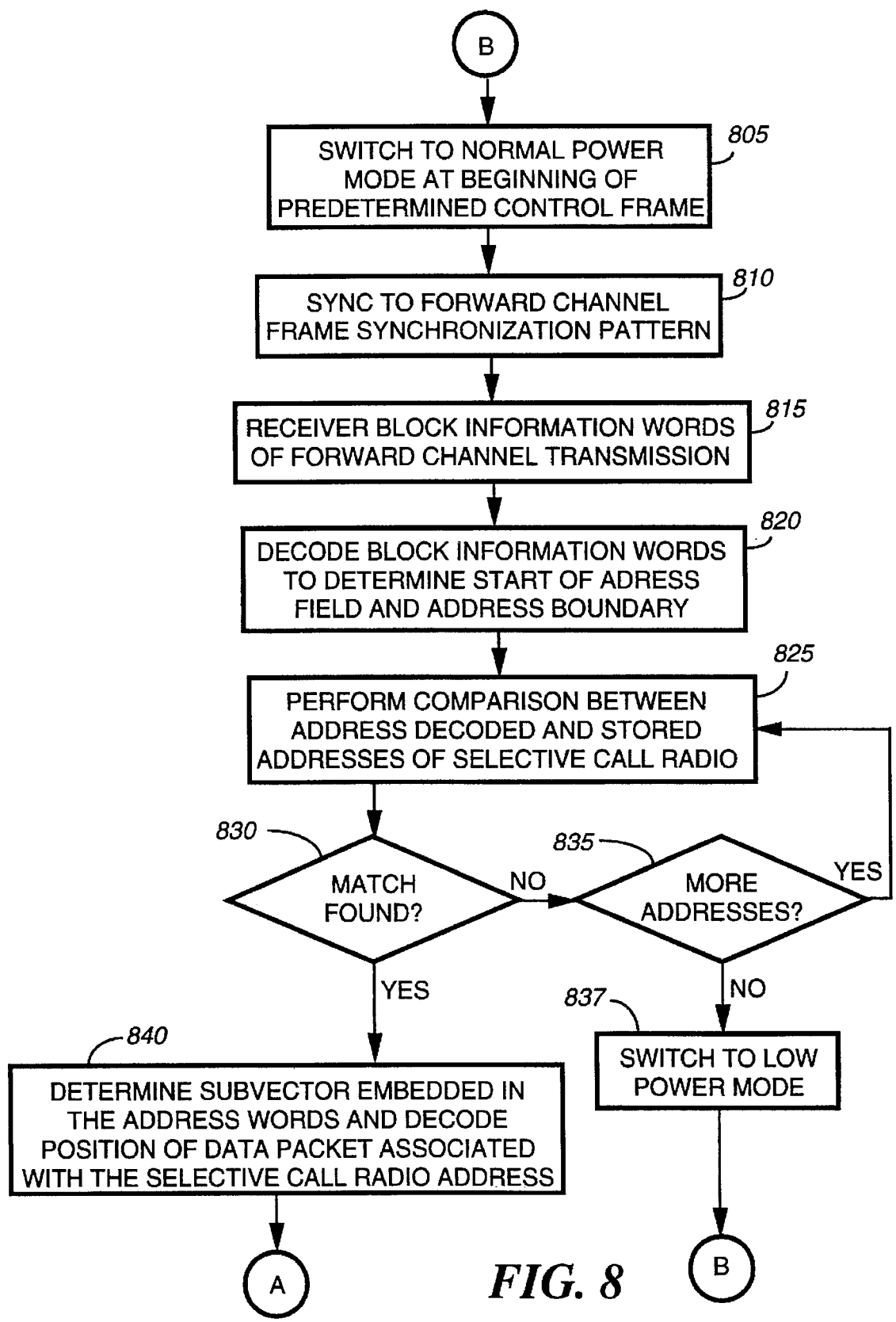
FIGS. 8 and 9 show a flow chart of a method used in the selective call radio, in accordance with a preferred embodiment of the present invention.
Figure 9:
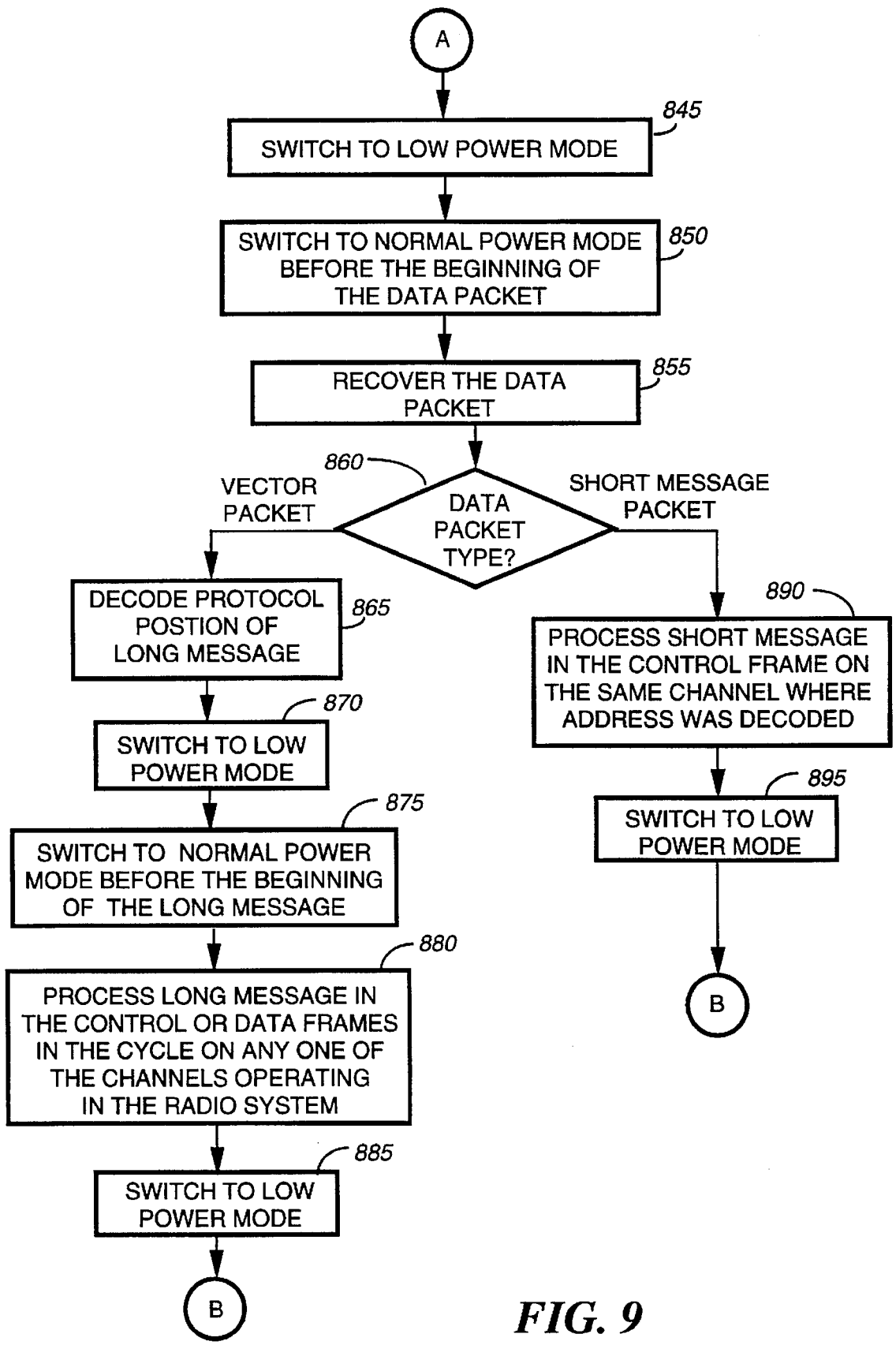

FIGS. 8 and 9 show a flow chart which illustrates a method used in a selective call radio 106 for decoding forward channel information received on a forward channel radio signal transmitted in the radio communication system 100, in accordance with the preferred embodiment of the present invention.

At step 805, the selective call radio 106 switches from a low power mode to a normal power mode operation. The switching is done at the beginning of predetermined control frames 360 that the selective call radio 106 receives and decodes. At step 810, the selective call radio 106 receives a forward channel radio signal, and achieves synchronization using the forward channel frame synchronization word 331 at the beginning of the control frame 360. After bit synchronization is achieved the selective call radio 106 receives and demodulates block information words present in the system information field 332 of the forward channel radio signal, at step 815. The block information words are decoded by the selective call radio 106 to find the start of address field and the address boundary 334 in the control frame, at step 820.

At step 825, the selective call radio 106 compares an address decoded in the address field 333 of the control frame 360, to the embedded addresses stored in the selective call radio 106. When a match is not found by the selective call radio 106, at step 830, and when more addresses are found in the address field 333 at step 835, the selective call radio 106 decodes the next address in the address field 333 of the control frame 360 and performs the comparison at step 825. When no more addresses are present in the address field 333 of the control frame 360, at step 835, the selective call radio 106 switches to the low power mode at the address boundary 334, at step 837, and waits for the next predetermined control frame that it has to decode. When a match is found, at step 830, a subvector embedded in the selective call radio's address is decoded from the forward channel radio signal and the starting position of a data packet associated with the address is determined, at step 840, and the selective call radio 106 switches to the low power mode to conserve battery life, at step 845. The selective call radio switches to the normal power mode before the starting position of the data packet, at step 850. The data packet is recovered by the selective call radio 106, at step 855, and the type of the data packet is determined at step 860.

When the data packet is a short message packet, the short message packet is processed at step 890. The short message packet is received by the selective call radio 106 on the same radio channel and in the same control frame 360 as that of the control frame 360 in which the selective call address of the selective call radio 106 is decoded. The selective call radio 106 determines the length of the data packet from information within the data packet. At step 895, the selective call radio switches to the low power mode at the end of the data packet and waits for the next predetermined control frame 360 that it has to decode.

When the data packet, at step 860, is a vector packet, the selective call radio decodes a starting position and length of a long message, at step 865. At step 870, the selective call radio 106 switches to the low power mode at the end of the vector packet to conserve battery life. The selective call radio 106 switches to the normal power mode before the beginning of the long message, at step 875. The long message is processed in the control frame 360 or data frame 370 identified by the vector packet in a cycle 320 transmitted on any one of the radio channels operating in the radio communication system 100. At step 885, the selective call radio 106 switches to low power mode at the end of the long message to conserve battery life, and waits for the next predetermined control frame 360 that it has to decode.

By now it should be appreciated that there has been provided an improved method and apparatus for identifying the position of message information in a radio signal which offers enhanced flexibility over prior art techniques, and is particularly useful in radio communication systems employing a plurality of radio channels and inbound messages. The improved method and apparatus uses a portion of the address field to indicate the position of data packets, which can be short messages or vectors. The short messages, which can be several words long, allow the communication of small amounts of information without having to direct a selective call radio to another protocol position, and the vectors allow the communication of longer messages anywhere, on any channel, within the outbound protocol of the radio communication system. The vectors are only as long as necessary for conveying the protocol position of a long message.

We claim:

1. A method used in a selective call radio for receiving a radio signal transmitted on a first radio channel having short and long messages included in a plurality of control frames and data frames, each of the short and long messages having an address signal and related message information, wherein each control frame comprises an address field and an information field, and wherein the address field of a control frame has a set of address signals, and wherein each of the set of address signals includes a subvector and an address indicating, respectively, a position of a data packet within the control frame and one of a plurality of selective call radios associated with the data packet, and wherein the information field follows the address field and has a set of data packets, and wherein each data packet in the set of data packets has the position of the data packet indicated by at least one subvector within the control frame, and wherein each data packet in the set of data packets is one of a vector packet and a short message packet, and wherein vector packets indicate starting positions of long messages within the plurality of control frames and data frames, and wherein the plurality of control frames and data frames are transmitted periodically at predetermined times, and wherein the selective call radio has a normal power mode for receiving radio signals and a low power mode during which radio signals cannot be received, and wherein the first data packet has a data packet length and the first long message has a long message length, and wherein the method comprises the steps of:

receiving the radio signal;

determining a presence of a first address within the address field in the control frame received in the radio signal, when the first address matches an embedded address assigned to the selective call radio;

determining a first subvector included with the first address;

decoding a starting position of a first data packet indicated by a value of the first subvector;

recovering the first data packet at the starting position of the first data packet;

decoding a starting position of a first long message when the first data packet is a vector packet;

processing the first long message beginning at the starting position of the first long message;

switching to the normal power mode at a beginning of a predetermined control frame, wherein the predetermined control frame includes the address of the selective call radio in the address field when the first long message is scheduled to be transmitted within a predetermined period;

switching to the low power mode when an address present in the address field of the predetermined control frame is determined to match the embedded address;

switching to the low power mode after the address field is received when no address present in the address field of the predetermined control frame is determined to match the embedded address;

switching to the normal power mode at the starting position of the first long message;

switching to the normal power mode at the starting position of the first data packet;

switching to the low power mode after a duration equivalent to the data packet length; and switching to the low power mode after a duration equivalent to the long message length.

2. A method used in a selective call radio for receiving a radio signal transmitted on a first radio channel having short and long messages included in a plurality of control frames and data frames, each of the short and long messages having an address signal and related message information, wherein each control frame comprises an address field and an information field, and wherein the address field of a control frame has a set of address signals, and wherein each of the set of address signals includes a subvector and an address indicating, respectively, a position of a data packet within the control frame and one of a plurality of selective call radios associated with the data packet, and wherein the information field follows the address field and has a set of data packets, and wherein each data packet in the set of data packets has the position of the data packet indicated by at least one subvector within the control frame, and wherein each data packet in the set of data packets is one of a vector packet and a short message packet, and wherein vector packets indicate starting positions of long messages within the plurality of control frames and data frames, and wherein the selective call radio is for receiving radio signals on a plurality of radio channels, and wherein the control frame which includes the first data packet is transmitted on a first radio channel, and wherein a frame including the first long message is transmitted on a second radio channel, and wherein the method comprises the steps of:

receiving the radio signal;

determining a presence of a first address within the address field in the control frame received in the radio signal, when the first address matches an embedded address assigned to the selective call radio;

determining a first subvector included with the first address;

decoding a starting position of a first data packet indicated by a value of the first subvector;

recovering the first data packet at the starting position of the first data packet;

decoding a starting position of a first long message when the first data packet is a vector packet;

processing the first long message beginning at the starting position of the first long message; and switching from the first radio channel to the second radio channel prior to the step of processing the first long message.

3. A selective call radio for receiving a radio signal transmitted on a first radio channel, wherein the radio signal has short and long messages included in a plurality of control frames and data frames, each of the short and long messages having an address signal and related message information, wherein each control frame comprises an address field and an information field, and wherein the address field of a control frame has a set of address signals, and wherein each of the set of address signals includes a subvector and an address indicating, respectively, a starting position of a data packet within the control frame and one of a plurality of selective call radios associated with the data packet, and wherein the information field follows the address field and has a set of data packets, and wherein each data packet in the set of data packets has the starting position of the data packet indicated by a value of at least one subvector within the control frame, and wherein each data packet in the set of data packets is one of a vector packet and a short message packet, and wherein vector packets indicate starting positions of long messages within the plurality of control frames and data frames, and wherein the plurality of control frames and data frames are transmitted periodically at predetermined times, said selective call radio comprising:

a receiver for receiving the radio signal;

an address decoder coupled to said receiver for determining a presence of a first address within the address field in a control frame received in the radio signal when the first address matches an embedded address assigned to the selective call radio;

a subvector element coupled to said receiver and said address decoder for determining a first subvector included with the first address;

a data packet position decoder coupled to said subvector element for decoding a starting position of a first data packet indicated by the first subvector;

a data packet buffer coupled to said receiver and said data packet position decoder for recovering the first data packet at the starting position of the data packet;

a protocol position decoder coupled to said data packet buffer for decoding a starting position of a first long message when the first data packet is a vector packet;

a long message processor coupled to said receiver and said protocol position decoder for processing the first long message at the starting position of the first long message;

a power mode controller for setting the power mode into a normal power mode for receiving radio signals and a low power mode during which radio signals cannot be received, said power mode controller comprising a control frame identifier element coupled to said receiver for setting the power mode to the normal power mode at a beginning of a predetermined control frame, wherein the predetermined control frame includes the address of the selective call radio in the address field when the first long message intended for the selective call radio is scheduled to be transmitted within a predetermined period, an address switch coupled to said address decoder for setting the power mode to the low power mode when an address present in the address field of the predetermined control frame is determined to match the embedded address, an address field switch coupled to said receiver and address element for setting the power mode to the low power mode after the address field is received when no address present in the address field of the predetermined control frame is determined to match the embedded address, and a message switch coupled to said receiver, said protocol position decoder, and said data packet position decoder for setting the power mode to the normal power mode at the starting position of the first long message, wherein the first data packet has a data packet length and the first long message has a long message length, and wherein said message switch is also for switching to the normal power mode at the starting position of the first data packet, switching to the low power mode after a duration equivalent to the data packet length, and switching to the low power mode after a duration equivalent to the long message length of the first long message.

4. A selective call radio for receiving a radio signal transmitted on a first radio channel, wherein the radio signal has short and long messages included in a plurality of control frames and data frames, each of the short and long messages having an address signal and related message information, wherein each control frame comprises an address field and an information field, and wherein the address field of a control frame has a set of address signals, and wherein each of the set of address signals includes a subvector and an address indicating, respectively, a starting position of a data packet within the control frame and one of a plurality of selective call radios associated with the data packet, and wherein the information field follows the address field and has a set of data packets, and wherein each data packet in the set of data packets has the starting position of the data packet indicated by a value of at least one subvector within the control frame, and wherein each data packet in the set of data packets is one of a vector packet and a short message packet, and wherein vector packets indicate starting positions of long messages within the plurality of control frames and data frames, and wherein the selective call radio is for receiving radio signals on a plurality of radio channels, and wherein the control frame which includes the first data packet is transmitted on a first radio channel, and wherein a frame including the first long message is transmitted on a second radio channel, said selective call radio comprising:

a receiver for receiving the radio signal;

an address decoder coupled to said receiver for determining a presence of a first address within the address field in a control frame received in the radio signal when the first address matches an embedded address assigned to the selective call radio;

a subvector element coupled to said receiver and said address decoder for determining a first subvector included with the first address;

a data packet position decoder coupled to said subvector element for decoding a starting position of a first data packet indicated by the first subvector;

a data packet buffer coupled to said receiver and said data packet position decoder for recovering the first data packet at the starting position of the data packet;

a protocol position decoder coupled to said data packet buffer for decoding a starting position of a first long message when the first data packet is a vector packet;

a long message processor coupled to said receiver and said protocol position decoder for processing the first long message at the starting position of the first long message; and a channel selector for switching from the first radio channel to the second radio channel before receiving the first long message.

5. A method used in a system controller for generating a radio signal transmitted on a first radio channel, wherein the radio signal has short and long messages included in a plurality of control frames and data frames, each of the short and long messages having an address signal and related message information, and wherein a set of radio channels are used to transmit the radio signal, the method comprising the steps of:

generating an address field of a control frame having a set of address signals, wherein each of the set of address signals includes an address and a subvector values of which indicate, respectively, a selective call radio for which one of the short and long messages is intended, and a starting position of a data packet within the control frame;

generating an information field following the address field and having a set of data packets, wherein each data packet in the set of data packets has the starting position of the data packet indicated at least one subvector within the control frame, and wherein each data packet in the set of data packets is one of a vector packet and a short message packet, and wherein vector packets indicate starting positions of long messages within the plurality of control frames and data frames;

assembling each control frame comprising an address field and an information field;

assembling each data frame comprising a set of long messages, wherein each long message in the set of long messages has a starting position indicated by at least one vector packet in a control frame; and transferring the control frames and data frames to a transmitter for radio transmission;

identifying from the set of radio channels a radio channel used for transmitting each control frame and each data frame; and wherein in said step of generating an information field, an identification of the radio channel used for transmitting a data frame which includes a long message is included in the starting position of the long message.

6. A system controller for generating a radio signal transmitted on a first radio channel, wherein the radio signal has short and long messages included in a plurality of control frames and data frames, each of the short and long messages having an address signal and related message information, the system controller comprising:

a control frame element for assembling each control frame comprising an address field and an information field;

an address field element, coupled to an outbound message memory which stores the short and long messages, and coupled to said control frame element, for generating an address field of a control frame having a set of address signals, wherein each of the set of address signals includes an address and a subvector, values of which indicate, respectively, a selective call radio for which one of the short and long messages is intended, and a starting position of a data packet within the control frame;

an information field element, coupled to said outbound message memory, said address field element, and said control frame element, for generating an information field following the address field and having a set of data packets, wherein each data packet in the set of data packets has the starting position of the data packet indicated by at least one subvector within the control frame, and wherein each data packet in the set of data packets is one of a vector packet and a short message packet, and wherein vector packets indicate starting positions of long messages within the plurality of control frames and data frames;

a data frame element, coupled to said information field element, for assembling each data frame comprising a set of long messages, wherein each long message in the set of long messages has a starting position indicated by at least one vector packet in a control frame; and a cell site controller, coupled to said data frame element and said control frame element, for transferring the control frames and data frames to a transmitter for radio transmission; and a channel assignment element, coupled to said address field element and said data frame element, for identifying one of a plurality of radio channels associated with each control frame and data frame, and wherein said information field element includes an identification of the one of the plurality of radio channels associated with the long message in the starting position of each long message.

\* \* \* \* \*